E. O. SPILLMAN.
PISTON FOR EXPLOSIVE ENGINES.
APPLICATION FILED NOV. 11, 1916.
1,229,540.
Patented June 12, 1917.
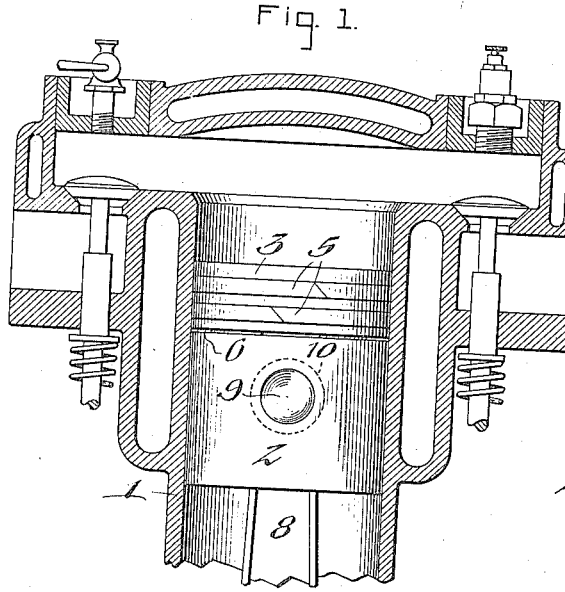
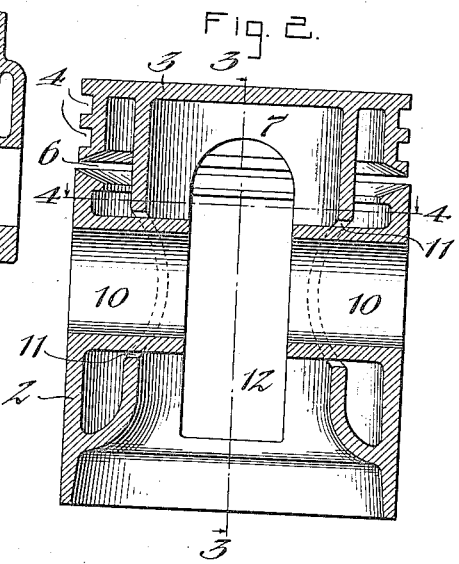
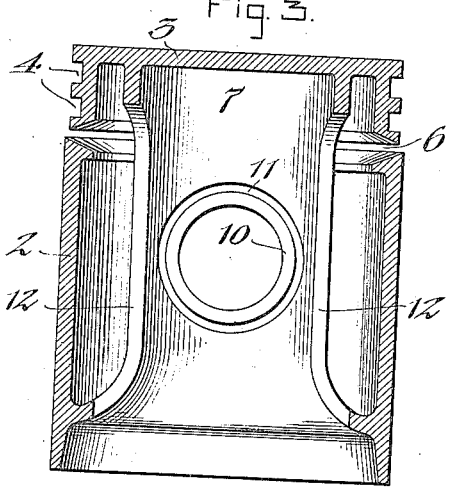
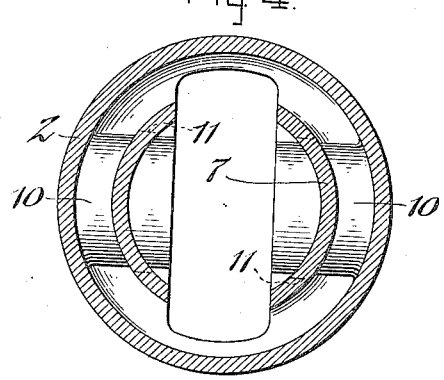
INVENTOR
Edward O. Spillman
by Geyer & Pope
ATTORNEYS.

UNITED STATES PATENT OFFICE.

EDWARD O. SPILLMAN, OF NORTH TONAWANDA, NEW YORK.

PISTON FOR EXPLOSIVE-ENGINES.

1,229,540.  Specification of Letters Patent.  Patented June 12, 1917.

Application filed November 11, 1916. Serial No. 130,823.

*To all whom it may concern:*

Be it known that I, EDWARD O. SPILLMAN, a citizen of the United States, residing at North Tonawanda, in the county of Niagara and State of New York, have invented new and useful Improvements in Pistons for Explosive-Engines, of which the following is a specification.

This invention relates more particularly to the pistons of explosion engines or motors, and is in the nature of an improvement in the piston shown and described in Letters Patent of the United States No. 1,092,870, granted April 14, 1914, to Louis P. Mooers and myself.

The object of my invention is to so construct the piston that the conduction or transmission of heat from the head to the bearings of the wrist-pin is minimized to obviate binding or undue friction of the wrist-pin and obtain the maximum efficiency of the motor.

In the accompanying drawings: Figure 1 is a fragmentary sectional elevation of a motor equipped with my improved piston. Fig. 2 is an enlarged vertical longitudinal section of the piston taken through the axis of the wrist-pin bearings. Fig. 3 is a similar section on line 3—3, Fig. 2. Fig. 4 is a transverse section of the same on line 4—4, Fig. 2.

Similar characters of reference indicate corresponding parts throughout the several views.

1 indicates a motor-cylinder of any ordinary construction, the same forming no part of my invention.

2 indicates the body or guide portion of the improved piston, and 3 the head or top portion thereof which, as shown, is provided with the customary annular grooves 4 for receiving the packing rings 5.

As in the patent above referred to, the wall of the head is preferably isolated or separated from the wall of the guide portion of the piston by a gap or space 6 of suitable width to minimize the transmission of heat from said head section to said guide section and prevent binding of the latter in the cylinder, as more fully described in said patent. In the construction shown, the two sections of the divided piston are tied together by a tubular longitudinal web 7 arranged within the sections and cast in one piece therewith, but separated from the surrounding walls thereof by a comparatively wide space except at its lower end where it joins the wall of the guide-section 2.

8 indicates the usual connecting rod of the piston and 9 the wrist-pin carried by the same. This pin is journaled in suitable bearings 10, which are preferably integral with the guide section 2 of the piston, as clearly shown in Fig. 2. They extend inwardly from diametrically-opposite sides of the wall of the guide section and pass through openings 11, 11 arranged in the tubular web 7 and made of considerably larger diameter than the external diameter of the bearings to leave a non-conducting air-gap or space between the web and the bearings. This isolated construction of the bearings effectively prevents direct and excessive transmission of heat from the web to the bearings and the wrist-pin avoiding binding of the latter and reducing friction to a minimum. It is apparent that in order to reach the bearings, the heat from the hot piston-head 3 has to travel downwardly throughout the length of the web 7 to the point where it joins the lower-portion of the guide section 2 and thence upwardly to the outer ends of the bearings. Owing to this long path of travel, the reduction of temperature at the bearings is sufficient to avoid undue or objectionable heating of them and the wrist pin, and inasmuch as the lower portion of the piston and the web are constantly cooled by the supply of oil in the crank case and from the cooled cylinder walls, the amount of heat transmitted from the piston-head to their bearings is practically reduced to a negligible degree, insuring a smooth and easy operation of the wrist pin as well as the piston.

To facilitate the circulation of the oil through the web, the latter may be provided in opposite sides with openings 12.

While affording the above advantage, the improvement does not increase the cost of the piston.

I claim as my invention:

1. A piston comprising a head-section, a guide-section forming a cross head, means connecting said sections and located at a distance from their walls, and a wrist-pin bearing supported on said cross head and isolated from said connecting means by a non-conducting gap.

2. A piston comprising a head-section, a guide-section forming a cross head and having its wall isolated from the wall of the head-section by a non-conducting gap, a web arranged lengthwise within said sections and connecting the same, and a wrist-pin bearing supported on said cross head and isolated from said web by a non-conducting gap.

3. A piston comprising a head-section, a guide-section isolated from the head-section by a non-conducting gap, an internal web connecting said head-section with said guide-section, and wrist-pin bearings mounted on said guide-section, said web being provided in opposite sides with openings for the passage of said wrist-pin bearings which are larger in diameter than the bearings, to leave a non-conducting gap between said last-named parts.

4. A piston comprising a head-section, a guide-section isolated from the head-section by a non-conducting gap, a tubular web arranged lengthwise within said sections and connecting the same and provided within the guide-section with openings, and wrist-pin bearings mounted on said guide-section and extending inwardly through said openings, the bearings being isolated from the edges of said openings by non-conducting gaps.

EDWARD O. SPILLMAN.